US012709686B2

(12) United States Patent
Hamakubo et al.

(10) Patent No.: US 12,709,686 B2
(45) Date of Patent: Aug. 18, 2026

(54) RESIN COMPOSITION, OPTICAL FIBER, AND METHOD FOR PRODUCING OPTICAL FIBER

(71) Applicant: SUMITOMO ELECTRIC INDUSTRIES, LTD., Osaka (JP)

(72) Inventors: Katsushi Hamakubo, Osaka (JP); Noriaki Iwaguchi, Osaka (JP); Takashi Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 510 days.

(21) Appl. No.: 18/039,318

(22) PCT Filed: Nov. 4, 2021

(86) PCT No.: PCT/JP2021/040597
§ 371 (c)(1),
(2) Date: May 30, 2023

(87) PCT Pub. No.: WO2022/123969
PCT Pub. Date: Jun. 16, 2022

(65) Prior Publication Data

US 2024/0052173 A1 Feb. 15, 2024

(30) Foreign Application Priority Data

Dec. 7, 2020 (JP) ................................ 2020-202628

(51) Int. Cl.
*C09D 4/00* (2006.01)
*C03C 25/1065* (2018.01)
(Continued)

(52) U.S. Cl.
CPC ............ *C09D 4/00* (2013.01); *C03C 25/1065* (2013.01); *C03C 25/326* (2013.01); *C03C 25/42* (2013.01);
(Continued)

(58) Field of Classification Search
CPC ... C09D 4/00; C09D 7/65; C09D 7/61; C09D 133/14; C03C 25/47; C03C 25/1065; C03C 25/326; C03C 25/42; G02B 6/02395
See application file for complete search history.

(56) References Cited

U.S. PATENT DOCUMENTS

2001/0025062 A1* 9/2001 Szum .................. C03C 25/106
522/96
2004/0151457 A1 8/2004 Naruse et al.
(Continued)

FOREIGN PATENT DOCUMENTS

CN 105372752 A 3/2016
CN 107073816 A 8/2017
(Continued)

OTHER PUBLICATIONS

Hiroaki Gotoh et al., Optically transparent, high-toughness elastomer using a polyrotaxane cross-linker as a molecular pulley. Sci. Adv.4,eaat7629(2018).DOI:10.1126/sciadv.aat7629 (Year: 2018).*

*Primary Examiner* — Peter Radkowski
(74) *Attorney, Agent, or Firm* — Faegre Drinker Biddle & Reath LLP

(57) ABSTRACT

A resin composition for primary coating of an optical fiber contains a photopolymerizable compound, a photopolymerization initiator, and a silane coupling agent, wherein the photopolymerizable compound contains a urethane (meth) acrylate and an ultraviolet curable polyrotaxane, and the content of the polyrotaxane is 0.05% by mass or more and 11% by mass or less based on the total amount of the photopolymerizable compound.

9 Claims, 1 Drawing Sheet

(51) Int. Cl.

| | |
|---|---|
| ***C03C 25/326*** | (2018.01) |
| ***C03C 25/42*** | (2006.01) |
| ***C03C 25/47*** | (2018.01) |
| ***C09D 7/61*** | (2018.01) |
| ***C09D 7/65*** | (2018.01) |
| ***C09D 133/14*** | (2006.01) |
| ***G02B 6/02*** | (2006.01) |

(52) U.S. Cl.

CPC ................ *C03C 25/47* (2018.01); *C09D 7/61* (2018.01); *C09D 7/65* (2018.01); *C09D 133/14* (2013.01); *G02B 6/02395* (2013.01)

(56) References Cited

U.S. PATENT DOCUMENTS

| | | | | |
|---|---|---|---|---|
| 2016/0047977 | A1 | 2/2016 | Sohma et al. | |
| 2016/0056421 | A1 | 2/2016 | Kim et al. | |
| 2017/0335044 | A1* | 11/2017 | Hayashi | C08G 65/332 |
| 2018/0230326 | A1* | 8/2018 | Hase | C09D 167/02 |
| 2018/0364437 | A1 | 12/2018 | Tachibana et al. | |

FOREIGN PATENT DOCUMENTS

| | | | |
|---|---|---|---|
| EP | 2 787 010 | A1 | 10/2014 |
| JP | 2004-244618 | A | 9/2004 |
| JP | 2009-197163 | A | 9/2009 |
| JP | 2014-219550 | A | 11/2014 |
| JP | 2016-532254 | A | 10/2016 |
| JP | 2019-007992 | A | 1/2019 |
| TW | 202016192 | A | 5/2020 |
| WO | 2016/071811 | A1 | 5/2016 |
| WO | WO-2016/072356 | A1 | 5/2016 |
| WO | WO-2016/171187 | A1 | 10/2016 |
| WO | WO-2019/159977 | A1 | 8/2019 |
| WO | WO-2020/255829 | A1 | 12/2020 |

* cited by examiner

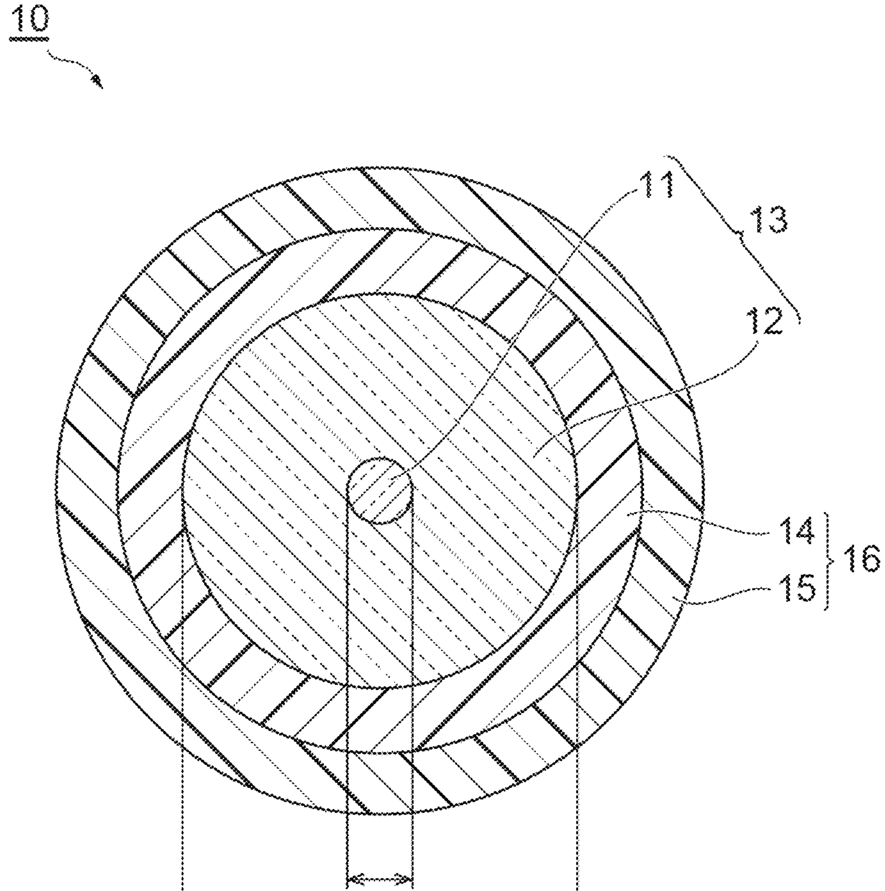
10
11
13
12
14
16
15
D1
D2

RESIN COMPOSITION, OPTICAL FIBER, AND METHOD FOR PRODUCING OPTICAL FIBER

TECHNICAL FIELD

The present disclosure relates to a resin composition for primary coating of an optical fiber, an optical fiber, and a method for manufacturing the optical fiber.

This application claims priority based on Japanese Patent Application No. 2020-202628 filed on Dec. 7, 2020, and incorporates all the contents described in the Japanese application.

BACKGROUND ART

An optical fiber generally has a coating resin layer for protecting a glass fiber that is an optical transmission medium. In order to reduce an increase in transmission loss induced by micro-bend generated when lateral pressure is applied to the optical fiber, the optical fiber has been required to have excellent lateral pressure characteristics.

The coating resin layer of the optical fiber can be formed by using an ultraviolet curable resin composition containing a photopolymerizable compound, a photopolymerization initiator and the like. For example, in Patent Literature 1, it is investigated to improve the lateral pressure characteristics of the optical fiber by forming a coating resin layer using an ultraviolet curable resin composition containing a filler made of synthetic silica as a raw material.

CITATION LIST

Patent Literature

[Patent Literature 1] JP 2014-219550 A

SUMMARY OF INVENTION

A resin composition for primary coating of an optical fiber according to an aspect of the present disclosure comprises a photopolymerizable compound, a photopolymerization initiator, and a silane coupling agent, wherein the photopolymerizable compound comprises a urethane (meth)acrylate and an ultraviolet curable polyrotaxane, and the content of the polyrotaxane is 0.05% by mass or more and 11% by mass or less based on the total amount of the photopolymerizable compound.

An optical fiber according to an aspect of the present disclosure comprises a glass fiber comprising a core and a cladding, a primary resin layer being in contact with the glass fiber and coating the glass fiber, and a secondary resin layer coating the primary resin layer, wherein the primary resin layer comprises a cured product of the above resin composition.

A method for manufacturing the optical fiber according to an aspect of the present disclosure comprises an application step of applying the above resin composition onto the outer periphery of a glass fiber comprising a core and a cladding and a curing step of curing the resin composition by irradiation with ultraviolet rays after the application step.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

The coating resin layer of the optical fiber generally comprises a primary resin layer and a secondary resin layer. From the viewpoint of improving the lateral pressure characteristics of the optical fiber, it is desirable to reduce the Young's modulus of the primary resin layer. However, decreasing the Young's modulus of the primary resin layer causes reduction in the strength of the primary resin layer. Therefore, cross-linking breaks in the primary resin layer during screening of the optical fiber are likely to occur, and voids are likely to occur in the optical fiber, which causes an increase in loss in the reliability test.

An object of the present disclosure is to provide a resin composition capable of forming a primary resin layer that can improve the lateral pressure characteristics and the void resistance of the optical fiber, and an optical fiber having excellent lateral pressure characteristics and void resistance.

Effects of the Present Disclosure

The present disclosure can provide a resin composition capable of forming a primary resin layer that can improve the lateral pressure characteristics and the void resistance of the optical fiber, and an optical fiber having excellent lateral pressure characteristics and void resistance.

DESCRIPTION OF EMBODIMENTS OF THE PRESENT DISCLOSURE

First, the contents of the embodiment of the present disclosure will be described by listing them. A resin composition for primary coating of the optical fiber according to an aspect of the present disclosure contains a photopolymerizable compound, a photopolymerization initiator, and a silane coupling agent, wherein the photopolymerizable compound comprises a urethane (meth)acrylate and an ultraviolet curable polyrotaxane, and the content of the polyrotaxane is 0.05% by mass or more and 11% by mass or less based on the total amount of the photopolymerizable compound.

Such a resin composition can form a primary resin layer capable of improving lateral pressure characteristics and void resistance of an optical fiber. That is, the primary resin layer formed by using the resin composition described above has a low Young's modulus, and thus the lateral pressure characteristics of the optical fiber can be improved. In addition, by making the stress applied to the optical fiber uniform during screening and relieving the stress, it is possible to suppress cross-linking breakage in the primary resin layer, so that the void resistance of the optical fiber can be improved.

From the viewpoint of further improving the lateral pressure characteristics and void resistance of the optical fiber, the polyrotaxane may contain a cyclic molecule having at least one ultraviolet curable group selected from the group consisting of an acryloyl group, a methacryloyl group, and a vinyl group.

From the viewpoint of further improving the lateral pressure characteristics and void resistance of the optical fiber, the polyrotaxane may contain a linear polymer having an adamantyl group.

From the viewpoint of further improving the lateral pressure characteristics and void resistance of the optical fiber, the resin composition may further contain an inorganic oxide particle.

An optical fiber according to an aspect of the present disclosure comprises a glass fiber comprising a core and a cladding, a primary resin layer being in contact with the glass fiber and coating the glass fiber, and a secondary resin layer coating the primary resin layer, wherein the primary resin layer comprises a cured product of the above resin composition. Such an optical fiber has excellent lateral pressure characteristics and void resistance.

A method for manufacturing an optical fiber according to an aspect of the present disclosure comprises an application step of applying the above resin composition onto the outer periphery of a glass fiber comprising a core and a cladding and a curing step of curing the resin composition by irradiation with ultraviolet rays after the application step. Such a method for manufacturing an optical fiber can manufacture an optical fiber having excellent lateral pressure characteristics and void resistance.

Detail of Embodiment of the Present Disclosure

Specific examples of a resin composition and an optical fiber according to the present embodiment of the present disclosure will be described referring to the drawing as necessary. The present disclosure is not limited to these examples, but is indicated by the scope of the claims, and is intended to include the meaning equivalent to the scope of the claims and all modifications within the scope. In the following description, the same reference numerals are given to the same elements in the description of the drawing, and redundant explanations are omitted.

<Resin Composition>

The resin composition according to the present embodiment contains a photopolymerizable compound, a photopolymerization initiator, and a silane coupling agent, and may further contain other components as necessary. Each component will be described in detail below.

(Photopolymerizable Compound)

The photopolymerizable compound comprises a urethane (meth)acrylate and an ultraviolet curable polyrotaxane.

The urethane (meth)acrylate according to the present embodiment is not particularly limited as long as it is a urethane (meth)acrylate that can be used as a photopolymerizable compound in the resin composition for primary coating. The urethane (meth)acrylate may be, for example, a reaction product of a polyol, a polyisocyanate, a hydroxyl group-containing (meth)acrylate, and optionally one or more compounds selected from monohydric alcohols and active hydrogen-containing silane compounds. (Meth)acrylate means an acrylate or a methacrylate corresponding to it. The same applies to (meth)acrylic acid.

Examples of the polyol include polyether polyol, polyester polyol, polycaprolactone polyol, polycarbonate polyol, polybutadiene polyol, and bisphenol A-ethylene oxide addition diol. Examples of the polyether polyol include polytetramethylene ether glycol, polyethylene glycol, and polypropylene glycol. These polyols may be used singly or in combination of two or more. From the viewpoint of easily adjusting the Young's modulus of the primary resin layer, it is preferable to use at least one selected from the group consisting of polypropylene glycol, polytetramethylene ether glycol, and polycarbonate polyol as the polyol.

From the viewpoint of obtaining a Young's modulus suitable for the primary resin layer, the number average molecular weight (Mn) of the polyol is preferably 2000 or more and 20000 or less, more preferably 2400 or more and 19000 or less, and further preferably 2800 or more and 18000 or less.

Examples of the polyisocyanate include diisocyanates such as 2,4-tolylene diisocyanate, 2,6-tolylene diisocyanate, isophorone diisocyanate, dicyclohexylmethane diisocyanate, diphenylmethane diisocyanate, hexamethylene diisocyanate, xylylene diisocyanate, hydrogenated xylylene diisocyanate, 1,5-naphthalene diisocyanate, norbornene diisocyanate, 1,5-pentamethylene diisocyanate, tetramethylxylylene diisocyanate, and trimethylhexamethylene diisocyanate. These polyisocyanates may be used singly or in combination of two or more.

Examples of the hydroxyl group-containing (meth)acrylate include 2-hydroxyethyl (meth)acrylate, 2-hydroxypropyl (meth)acrylate, 2-hydroxybutyl (meth)acrylate, caprolactone (meth)acrylate, 2-hydroxy-3-phenoxypropyl (meth)acrylate, 2-(meth)acryloyloxyethyl-2-hydroxyethyl phthalate, 2-hydroxy-o-phenylphenolpropyl (meth)acrylate, 2-hydroxy-3-methacrylpropyl acrylate, trimethylolpropane di(meth)acrylate, and pentaerythritol tri(meth)acrylate. These hydroxyl group-containing (meth)acrylates may be used singly or in combination of two or more. As the hydroxyl group-containing (meth)acrylate, it is preferable to use at least one selected from the group consisting of 2-hydroxyethyl (meth)acrylate, 2-hydroxypropyl (meth)acrylate, and 2-hydroxybutyl (meth)acrylate.

Examples of the monohydric alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, and 3-methyl-2-butanol. These monohydric alcohols may be used singly or in combination of two or more. In the urethane (meth)acrylate, introducing a group based on the monohydric alcohol to the terminal of the urethane bond can reduce the proportion of the terminal (meth)acryloyloxy group, which is a photopolymerizable group, and can reduce the Young's modulus of the primary resin layer.

Examples of the active hydrogen-containing silane compound include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-mercaptopropylmethyldimethoxysilane, and 3-mercaptopropyltrimethoxysilane. These active hydrogen-containing silane compounds may be used singly or in combination of two or more. In the urethane (meth)acrylate, introducing a group based on the active hydrogen-containing silane compound to the terminal of the urethane bond reduces the terminal (meth)acryloyloxy group, which is a photopolymerizable group, not only allowing the Young's modulus of the primary resin layer to be reduced, but also allowing the adhesion between the primary resin layer and the glass fiber to be improved.

Examples of the method for synthesizing urethane (meth)acrylate include: a method of reacting a polyol with a polyisocyanate and then reacting a hydroxyl group-containing (meth)acrylate (optionally one or more compounds selected from monohydric alcohols and active hydrogen-containing silane compounds); a method of reacting a polyisocyanate with a hydroxyl group-containing (meth)acrylate (optionally one or more compounds selected from monohydric alcohols and active hydrogen-containing silane compounds) and then reacting with a polyol; and a method of simultaneously reacting a polyol, a polyisocyanate, and a hydroxyl group-containing (meth)acrylate (optionally one or more compounds selected from monohydric alcohols and active hydrogen-containing silane compounds).

As a catalyst for synthesizing the urethane (meth)acrylate, for example, organotin compounds and amine compounds may be used. Examples of the organotin compound include dibutyltin dilaurate, dibutyltin diacetate, dibutyltin malate, dibutyltin bis(2-ethylhexyl mercaptoacetate), dibutyltin bis (isooctyl mercaptoacetate), and dibutyltin oxide. From the viewpoint of easy availability or catalytic performance, it is preferable to use dibutyltin dilaurate or dibutyltin diacetate as a catalyst.

From the viewpoint of obtaining a Young's modulus suitable for the primary resin layer, the Mn of the urethane (meth)acrylate is preferably 5000 or more and 40000 or less, more preferably 8000 or more and 38000 or less, and further preferably 10000 or more and 37000 or less.

The content of the urethane (meth)acrylate may be 10 parts by mass or more, 20 parts by mass or more, 30 parts by mass or more, or 40 parts by mass or more, or 90 parts by mass or less or 80 parts by mass or less, based on the total amount of 100 parts by mass of the resin composition.

The ultraviolet curable polyrotaxane is a compound composed of a linear polymer and a cyclic molecule. The linear polymer is included in the opening of the cyclic molecule in a condition of being skewered, and has blocking groups at both ends so that the cyclic molecule is not detached. The cyclic molecule has an ultraviolet curable group. The polyrotaxane has an ultraviolet curable group, and thus can form a covalent bond with a photopolymerizable compound such as urethane (meth)acrylate. Introducing such a polyrotaxane-based structure into the primary resin layer causes the stress applied to the optical fiber during screening to be uniform to relieve the stress, thereby allowing cross-linking breakage in the primary resin layer to be suppressed, and allowing the void resistance of the optical fiber to be improved.

The linear polymer has a linear main chain and a blocking group bonded to both ends of the main chain. Examples of the polymer constituting the main chain of the linear polymer include polyvinyl alcohol, polyvinylpyrrolidone, polyethylene glycol, polypropylene glycol, polyisoprene, polyisobutylene, polybutadiene, polytetrahydrofuran, polydimethylsiloxane, polyacrylamide, polyolefin, and polyester. Examples of the blocking group include a dinitrophenyl group, an adamantyl group, a trityl group, a fluorescein group, and a pyrene group. From the viewpoint of further improving the lateral pressure characteristics and void resistance of the optical fiber, the linear polymer preferably has an adamantyl group as a blocking group, and more preferably has a main chain based on polyethylene glycol and an adamantyl group as a blocking group. From a similar point of view, the polyrotaxane preferably contains a linear polymer having an adamantyl group as a blocking group, more preferably contains a linear polymer having a main chain based on polyethylene glycol and an adamantyl group as a blocking group.

The weight average molecular weight (Mw) of the linear polymer is preferably 3000 or more and 80000 or less, more preferably 5000 or more and 60000 or less, and further preferably 10000 or more and 40000 or less. The Mw of the linear polymer may be 35000 or less, 30000 or less, or 25000 or less.

Examples of the cyclic molecule include a cyclodextrin compound with an ultraviolet curable group and a crown ether compound with an ultraviolet curable group. Examples of the ultraviolet curable group possessed by the cyclic molecule include an acryloyl group, a methacryloyl group, and a vinyl group. From the viewpoint of further improving the lateral pressure characteristics and void resistance of the optical fiber, the polyrotaxane preferably contains a cyclic molecule having at least one ultraviolet curable group selected from the group consisting of an acryloyl group, a methacryloyl group, and a vinyl group, more preferably contains a cyclic molecule having at least one ultraviolet curable group selected from an acryloyl group and a methacryloyl group, and further preferably contains a cyclic molecule having an acryloyl group.

When the polyrotaxane contains a cyclic molecule having at least one ultraviolet curable group selected from an acryloyl group and a methacryloyl group, from the viewpoint of further improving the lateral pressure characteristics and void resistance of the optical fiber, the (meth)acryloyl group equivalent weight of the polyrotaxane is preferably 2000 g/eq or more, more preferably 2500 g/eq or more, and further preferably 3000 g/eq or more.

The Mw of the polyrotaxane is preferably 100000 or more and 1500000 or less, more preferably 140000 or more and 1300000 or less, and further preferably 160000 or more and 1200000 or less. The Mw of the polyrotaxane may be 1000000 or less, 800000 or less, 600000 or less, or 500000 or less. The Mw can be measured by the GPC method.

Commercially available products can be used as the polyrotaxane, such as SeRM Super Polymers "SM3403P", "SM2403P", "SM1303P", "SM2405P-10", "SM2405P-20", "SM1305P-10", "SM1305P-10", "SA3403P", "SA2403P", "SA1303P", "SA2405P-10", "SA2405P-20", "SA1305P-10", and "SA1305P-20", manufactured by Advanced Softmaterials, Inc.

The content of the polyrotaxane is 0.05% by mass or more and 11% by mass or less based on the total amount of the photopolymerizable compound, from the viewpoint of improving the lateral pressure characteristics and void resistance of the optical fiber. From the viewpoint of further improving the void resistance of the optical fiber, the content of the polyrotaxane is preferably 0.08% by mass or more, more preferably 0.1% by mass or more, based on the total amount of the photopolymerizable compound. From the viewpoint of further improving the lateral pressure characteristics of the optical fiber, the content of the polyrotaxane is preferably 10% by mass or less, more preferably 8% by mass or less, further preferably 6% by mass or less, and particularly preferably 5.5% by mass or less based on the total amount of the photopolymerizable compound. The content of the polyrotaxane may be 5% by mass or less, 4.5% by mass or less, 4% by mass or less, 3.5% by mass or less, 3% by mass or less, 2.5% by mass or less, 2% by mass or less, or 1.5% by mass or less, based on the total amount of the photopolymerizable compound.

The photopolymerizable compound according to the present embodiment may further contain a photopolymerizable compound (hereinafter referred to as "monomer") other than urethane (meth)acrylate and the polyrotaxane. As the monomer, a monofunctional monomer having one polymerizable group and a multifunctional monomer having two or more polymerizable groups can be used. The monomer may be used singly, or may be used in combination of two or more.

Examples of the monofunctional monomer include (meth) acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth) acrylate, lauryl (meth)acrylate, 2-phenoxyethyl (meth)acrylate, 3-phenoxybenzyl (meth)acrylate, phenoxydiethylene glycol acrylate, phenoxypolyethylene glycol (meth)acrylate, 4-tert-butylcyclohexanol (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxy polyethylene glycol (meth) acrylate, and isobornyl (meth)acrylate; carboxyl group-containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocycle containing (meth)acrylates such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth) acrylamide, N-methyl (meth)acrylamide, N-isopropyl (meth)acrylamide, N-butyl (meth)acrylamide, N-methylol (meth)acrylamide, and N-methylolpropane (meth)acrylamide; aminoalkyl (meth)acrylate monomers such as aminoethyl (meth)acrylate, aminopropyl (meth)acrylate, N, N-dimethylaminoethyl (meth)acrylate, and tert-butylaminoethyl (meth)acrylate; and succinimide monomers such as N-(meth)acryloyloxymethylene succinimide, N-(meth)acryloyl-6-oxyhexamethylene succinimide, and N-(meth)acryloyl-8-oxyoctamethylene succinimide.

Examples of the multifunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyl diol di(meth)acrylate, 3-ethyl-1, 8-octanediol di(meth)acrylate, EO adduct of bisphenol A di(meth)acrylate, trimethylol propane tri(meth)acrylate, trimethylol octane tri(meth)acrylate, trimethylol propane polyethoxy tri(meth)acrylate, trimethylol propane polypropoxy tri(meth)acrylate, trimethylol propane polyethoxy polypropoxy tri(meth)acrylate, tris[(meth)acryloyloxyethyl] isocyanurate, pentaerythritol tri(meth)acrylate, pentaerythritol polyethoxy tetra(meth)acrylate, pentaerythritol polypropoxy tetra(meth)acrylate, pentaerythritol tetra(meth) acrylate, ditrimethylol propane tetra(meth)acrylate, dipentaerythritol tetra(meth)acrylate, dipentaerythritol penta (meth)acrylate, dipentaerythritol hexa(meth)acrylate, and caprolactone-modified tris[(meth)acryloyloxyethyl] isocyanurate.

(Photopolymerization Initiator)

The photopolymerization initiator can be appropriately selected from known radical photopolymerization initiators and used.

Examples of the photopolymerization initiator include: 1-hydroxycyclohexyl phenyl ketone (trade name: Omnirad 184, manufactured by IGM Resins B.V), 2,2-dimethoxy-2-phenylacetophenone (trade name: Omnirad 651, manufactured by IGM Resins B.V), 2,4,6-trimethylbenzoyldiphenylphosphine oxide (trade name: Omnirad TPO, manufactured by IGM Resins B.V.), ethyl (2,4,6-trimethylbenzoyl)-phenylphosphinate (trade name: Omnirad TPO-L, manufactured by IGM Resins B.V.), 2-benzyl-2-dimethylamino-4'-morpholinobutyrophenone (trade name: Omnirad 369, manufactured by IGM Resins B.V.), 2-dimethylamino-2-(4-methyl-benzyl)-1-(4-morpholin-4-yl-phenyl)-but an-1-one (trade name: Omnirad 379, manufactured by IGM Resins B.V.), bis(2,4,6-trimethylbenzoyl)phenylphosphine oxide (trade name: Omnirad 819, manufactured by IGM Resins B.V.), and 2-methyl-1-[4-(methylthio)phenyl]-2-morpholinopropan-1-one (trade name: Omnirad 907, manufactured by IGM Resins B.V.). The photopolymerization initiator may be used singly, or may be used in combination of two or more.

(Silane Coupling Agent)

Examples of the silane coupling agent include tetramethyl silicate, tetraethyl silicate, mercaptopropyltrimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyltetrasulfide, and γ-trimethoxysilylpropylbenzothiazyltetrasulfide. These silane coupling agents may be used singly, or may be used in combination of two or more.

(Other Components)

The resin composition according to the present embodiment may further contain inorganic oxide particles, a photoacid generator, a leveling agent, an antifoaming agent, an antioxidant, an ultraviolet absorber, and the like.

The inorganic oxide particles may be hydrophobic inorganic oxide particles with the surfaces thereof hydrophobically treated. The hydrophobic treatment is introduction of a hydrophobic group onto the surface of the inorganic oxide particles. The inorganic oxide particles having a hydrophobic group introduced have excellent dispersibility in the resin composition. The hydrophobic group may be a reactive group such as a (meth)acryloyl group or a vinyl group, and may be a non-reactive group such as an aliphatic hydrocarbon group (for example, an alkyl group) and an aromatic hydrocarbon group (for example, a phenyl group).

The inorganic oxide particles may be dispersed in a dispersion medium. Using the inorganic oxide particles dispersed in the dispersion medium can uniformly disperse the inorganic oxide particles in the resin composition, and can improve the storage stability of the resin composition. The dispersion medium is not particularly limited as long as curing of the resin composition is not obstructed. The dispersion medium may be a reactive dispersion medium or a non-reactive dispersion medium.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate and polytetramethylene glycol di(meth) acrylate. Compounds exemplified by monomers described above may be used as the (meth)acryloyl compound.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium. When the dispersion medium including the inorganic oxide particles is observed with an optical microscope (about 100 times magnification) and particles are not observed, the inorganic oxide particles are regarded to be dispersed as the primary particles.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

From the viewpoint of excellent dispersibility in the resin composition, the inorganic oxide particles are preferably particles containing at least one selected from the group consisting of silicon dioxide (silica), zirconium dioxide (zirconia), aluminum oxide (alumina), magnesium oxide (magnesia), titanium oxide (titania), tin oxide, and zinc oxide, and it is more preferable to use hydrophobic silica particles.

The average primary particle size of the inorganic oxide particles may be 200 nm or less, 100 nm or less, or 80 nm or less, or may be 10 nm or more, 20 nm or more, or 30 nm or more. The average primary particle diameter can be measured with image analysis of electron microscope pictures, a light scattering method or a BET method, for example.

The content of the inorganic oxide particles may be 1% by mass or more and 60% by mass or less, 5% by mass or more and 50% by mass or less, or 10% by mass or more and 40% by mass or less based on the total amount of the photopolymerizable compound and the inorganic oxide particles.

<Optical Fiber>

The optical fiber according to the present embodiment comprises a glass fiber comprising a core and a cladding, a primary resin layer being in contact with the glass fiber and coating the glass fiber, and a secondary resin layer coating the primary resin layer.

FIG. 1 is a schematic cross-section diagram showing an example of the optical fiber according to the present embodiment. The optical fiber 10 comprises the glass fiber 13 comprising the core 11 and the cladding 12, and the coating resin layer 16 comprising the primary resin layer 14 provided on the outer periphery of the glass fiber 13 and the secondary resin layer 15.

The cladding 12 surrounds the core 11. The core 11 and the cladding 12 mainly comprise glass such as silica glass, and for example, germanium-added silica glass or pure silica glass can be used in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, for example, the thickness of the primary resin layer 14 may be 35 μm and the thickness of the secondary resin layer 15 may be 25 μm. The outside diameter of the optical fiber 10 may be about 245 μm to 265 μm.

When the outer diameter (D2) of the glass fiber 13 is about 125 μm and the thickness of the coating resin layer 16 is 24 μm or more and 48 μm or less, the thickness of each of the primary resin layer 14 and the secondary resin layer 15 may be about 8 μm to 38 μm, for example, the thickness of the primary resin layer 14 may be 25 μm and the thickness of the secondary resin layer 15 may be 10 μm. The outside diameter of the optical fiber 10 may be about 173 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, for example, the thickness of the primary resin layer 14 may be 25 μm and the thickness of the secondary resin layer 15 may be 10 μm. The outside diameter of the optical fiber 10 may be about 144 μm to 174 μm.

The primary resin layer 14 contains a cured product of the resin composition according to the present embodiment. The primary resin layer 14 can be obtained by curing the resin composition according to the present embodiment. By providing such a primary resin layer 14, the lateral pressure characteristics and void resistance of the optical fiber can be improved.

From the viewpoint of further improving the lateral pressure characteristics of the optical fiber, the Young's modulus of the primary resin layer 14 is preferably 0.8 MPa or less, more preferably 0.5 MPa or less at 23° C.±2° C.

The Young's modulus of the primary resin layer 14 can be measured by the Pullout Modulus (POM) method at 23° C. Two locations of the optical fiber is fixed with two chuck devices, the coating resin layer (primary resin layer and secondary resin layer) portion between the two chuck devices is removed. Then, one chuck device is fixed, and the other chuck device is gently moved in the direction opposite to the fixed chuck device. When L is the length of the portion sandwiched between the moving chuck devices in the optical fiber, Z is the movement amount of the chuck, Dp is the outer diameter of the primary resin layer, Df is the outer diameter of the glass fiber, and n is the Poisson's ratio of the primary resin layer, and W is the load when moving the chuck device, the Young's modulus of the primary resin layer can be obtained from the following formula.

$$\text{Young's} = \text{modulus (MPa)} = \left((1+n)W/\pi LZ\right)\times\ln\left(Dp/Df\right)$$

The secondary resin layer 15 can be formed, for example, by curing a resin composition containing a photopolymerizable compound containing urethane (meth)acrylate, a photopolymerization initiator, and the like. The photopolymerizable compound and the photopolymerization initiator are not particularly limited, and can be appropriately selected and used from the photopolymerizable compounds and photopolymerization initiators described above. A resin composition forming the secondary resin layer can be prepared by using a conventionally known technique. However, the resin composition forming the secondary resin layer has a different composition from the resin composition forming the primary resin layer.

<Method for Manufacturing Optical Fiber>

The method for manufacturing the optical fiber according to the present embodiment comprises an application step of applying the resin composition according to the present embodiment onto the outer periphery of a glass fiber comprising a core and a cladding and a curing step of curing the resin composition by irradiation with ultraviolet rays after the application step. The method for manufacturing the optical fiber according to the present embodiment can manufacture an optical fiber having excellent lateral pressure characteristics and void resistance by using the resin composition according to the present embodiment as the resin composition for primary coating.

EXAMPLES

Hereinafter, the results of evaluation test using Examples and Comparative Examples according to the present disclosure will be shown, and the present disclosure is described in more detail. The present disclosure is not limited to these examples.

[Resin Composition for Primary Coating]

(Photopolymerizable Compound)

As the urethane (meth)acrylate, a urethane acrylate (UA) obtained by reacting polypropylene glycol having a number average molecular weight of 4000, isophorone diisocyanate, 2-hydroxyethyl acrylate, and methanol was prepared. The number average molecular weight of the obtained urethane acrylate was 15000.

As the ultraviolet curable polyrotaxane, trade name "SA1305β-20" (Mw: 200000, Mw of linear polymer: 11000, acryloyl group equivalent: 3500 g/eq) and "SA2405β-20" (Mw: 400000, Mw of linear polymer: 20000, acryloyl group equivalent: 4000 g/eq) manufactured by Advanced Soft Materials, Inc. were prepared. These polyrotaxanes are polyrotaxanes containing a cyclic molecule having an acryloyl group and a linear polymer having an adamantyl group.

As the monomer, nonylphenol EO-modified acrylate (trade name: Aronix M-113, manufactured by Toagosei Co., Ltd.), N-vinylcaprolactam, and 1,6-hexanediol diacrylate were prepared.

(Photopolymerization Initiator)

As the photopolymerization initiator, 2,4,6-trimethylbenzoyldiphenylphosphine oxide (Omnirad TPO) was prepared.

(Silane Coupling Agent)

As the silane coupling agent, 3-mercaptopropyltrimethoxysilane was prepared.

(Other Components)

As the inorganic oxide particles, a silica sol obtained by dispersing hydrophobic silica particles having a non-reactive propyl group on the surface and an average primary particle size of 40 nm or more and 60 nm or less in methanol was prepared.

(Resin Composition)

Each component was mixed in the amounts shown in the following Tables 1 and 2 to obtain a resin composition for primary coating of each test example. Test Examples 1 to 8 correspond to Examples, and Test Examples 9 to 11 correspond to Comparative Examples.

In Tables 1 and 2, the numerical value of the polyrotaxane is the content (% by mass) based on the total amount of the photopolymerizable compound; the numerical values of each component of the photopolymerizable compound and 3-mercaptopropyltrimethoxysilane are the contents (% by mass) based on the total amount of each component of the photopolymerizable compound and 3-mercaptopropyltrimethoxysilane; the numerical value of silica particles is the content (% by mass) based on the total amount of the photopolymerizable compound and silica particles; and the numerical value of the photopolymerization initiator is the content (% by mass) based on the total amount of the photopolymerizable compound.

[Resin Composition for Secondary Coating]

There were mixed 35 parts by mass of urethane acrylate (Mn: 1300) obtained by reacting polypropylene glycol having a number average molecular weight of 600, 2,4-tolylene diisocyanate, and 2-hydroxyethyl acrylate, 30 parts by mass of epoxy acrylate, 15 parts by mass of isobornyl acrylate (trade name "IBXA", Osaka Organic Chemical Industry Co., Ltd.), 18 parts by mass of phenoxyethyl acrylate (trade name "Light Acrylate PO-A", Kyoeisha Chemical Co., Ltd.), 1 part by mass of 1-hydroxycyclohexylphenyl ketone, and 1 part by mass of 2,4,6-trimethylbenzoyldiphenylphosphine oxide to obtain a resin composition for secondary coating.

[Production of Optical Fiber]

The resin composition for primary coating and the resin composition for secondary coating were each applied to the outer periphery of a glass fiber having a diameter of 125 μm and composed of a core and a cladding. Then, each resin composition was cured by irradiation with ultraviolet rays to form a coating resin layer comprising a primary resin layer and a secondary resin layer, thereby producing an optical fiber. The thickness of the primary resin layer was set to 35 μm, and the thickness of the secondary resin layer was set to 25 μm. The linear speed was 1500 m/min.

[Young's Modulus of Primary Resin Layer]

The Young's modulus of the primary resin layer was measured by the Pullout Modulus (POM) method at 23° C.

[Lateral Pressure Characteristics of Optical Fiber]

The transmission loss of light having a wavelength of 1550 nm when the optical fiber was wound into a single layer on a bobbin having a diameter of 280 mm whose surface was covered with sandpaper was measured by an OTDR (Optical Time Domain Reflectometer) method. In addition, the transmission loss of light having a wavelength of 1550 nm when the optical fiber was wound into a single layer on a bobbin having a diameter of 280 mm without sandpaper was measured by the OTDR method. A difference in the measured transmission loss was obtained, and a case where the transmission loss difference was 0.6 dB/km or less was evaluated as "A", and a case where the transmission loss difference was more than 0.6 dB/km was evaluated as "B".

[Void Resistance of Optical Fiber]

A 10-m optical fiber was stored under a condition of 85° C. and 85% humidity for 120 days, then placed at −40° C. for 16 hours, and the presence or absence of voids with a diameter of 10 μm or more was observed under a microscope. The case where the number of voids per 1 m of the optical fiber was less than 1 was evaluated as "A", the case where the number of voids was 1 to 2 was evaluated as "B", and the case where the number of voids was more than 2 was evaluated as "C".

TABLE 1

| | Test Examples | | | | | |
|---|---|---|---|---|---|---|
| | 1 | 2 | 3 | 4 | 5 | 6 |
| SA2405P-20 | 0.1 | 0.3 | 0.5 | 1 | 3 | 5 |
| UA | 77 | 77 | 77 | 77 | 77 | 77 |
| Nonylphenol EO-modified acrylate | 14 | 14 | 14 | 14 | 14 | 14 |
| N-vinylcaprolactam | 6 | 6 | 6 | 6 | 6 | 6 |
| 1,6-Hexanediol diacrylate | 2 | 2 | 2 | 2 | 2 | 2 |
| 3-Mercaptopropyltrimethoxysilane | 1 | 1 | 1 | 1 | 1 | 1 |
| Omnirad TPO | 1 | 1 | 1 | 1 | 1 | 1 |
| Young's modulus (MPa) | 0.3 | 0.3 | 0.3 | 0.3 | 0.4 | 0.5 |
| Lateral pressure characteristics | A | A | A | A | A | A |
| Void resistance | A | A | A | A | A | A |

TABLE 2

| | Test Examples | | | | |
|---|---|---|---|---|---|
| | 7 | 8 | 9 | 10 | 11 |
| SA2405P-20 | — | 1 | — | 0.01 | 12 |
| SA1305P-20 | 1 | — | — | — | — |
| UA | 77 | 77 | 77 | 77 | 77 |
| Nonylphenol EO-modified acrylate | 14 | 14 | 14 | 14 | 14 |
| N-vinylcaprolactam | 6 | 6 | 6 | 6 | 6 |
| 1,6-Hexanediol diacrylate | 2 | 2 | 2 | 2 | 2 |
| 3-Mercaptopropyltrimethoxysilane | 1 | 1 | 1 | 1 | 1 |
| Silica particles | — | 20 | — | — | — |
| Omnirad TPO | 1 | 1 | 1 | 1 | 1 |
| Young's modulus (MPa) | 0.3 | 0.4 | 0.3 | 0.3 | 5 |
| Lateral pressure characteristics | A | A | A | A | B |
| Void resistance | A | A | B | B | A |

REFERENCE SIGNS LIST

10: Optical fiber, 11: Core, 12: Cladding, 13: Glass fiber, 14: Primary resin layer, 15: Secondary resin layer, 16: Coating resin layer, D1: Diameter of core 11, D2: Outer diameter of glass fiber 13.

The invention claimed is:

1. A resin composition for primary coating of an optical fiber, comprising:

a photopolymerizable compound;

a photopolymerization initiator; and a silane coupling agent, wherein the photopolymerizable compound comprises a urethane (meth)acrylate and an ultraviolet curable polyrotaxane, and a content of the polyrotaxane is 0.05% by mass or more and 11% by mass or less based on a total amount of the photopolymerizable compound.

2. The resin composition according to claim 1, wherein the polyrotaxane comprises a cyclic molecule having at least one ultraviolet curable group selected from the group consisting of an acryloyl group, a methacryloyl group, and a vinyl group.

3. The resin composition according to claim 1, wherein the polyrotaxane comprises a linear polymer having an adamantyl group.

4. The resin composition according to claim 1, further comprising an inorganic oxide particle.

5. An optical fiber, comprising:

a glass fiber comprising a core and a cladding;

a primary resin layer being in contact with the glass fiber and coating the glass fiber; and a secondary resin layer coating the primary resin layer, wherein the primary resin layer comprises a cured product of the resin composition according to claim 1.

6. A method for manufacturing an optical fiber, comprising:

an application step of applying the resin composition according to claim 1 onto an outer periphery of a glass fiber comprising a core and a cladding; and a curing step of curing the resin composition by irradiation with ultraviolet rays after the application step.

7. The resin composition according to claim 2, wherein the polyrotaxane comprises a linear polymer having an adamantyl group.

8. The resin composition according to claim 2, further comprising an inorganic oxide particle.

9. The resin composition according to claim 3, further comprising an inorganic oxide particle.

* * * * *